(No Model.)
J. JOHNSON.
PICKER STICK CHECK FOR LOOMS.
No. 502,970. Patented Aug. 8, 1893.
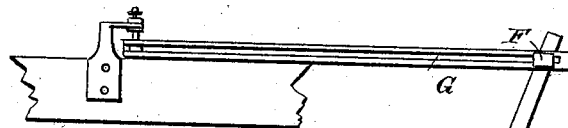
Fig. 1.
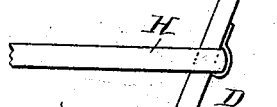
Fig. 4. Fig. 3.
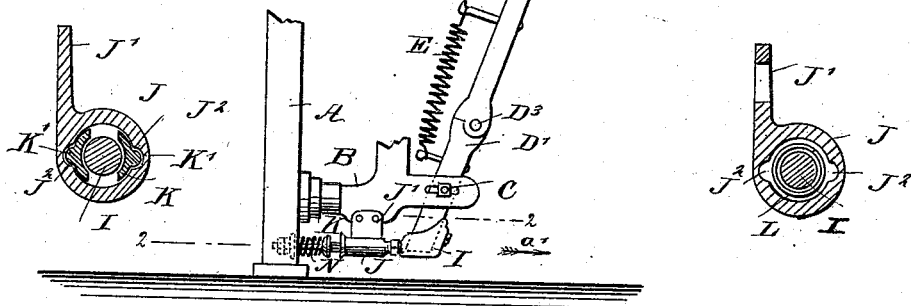
Fig. 2.
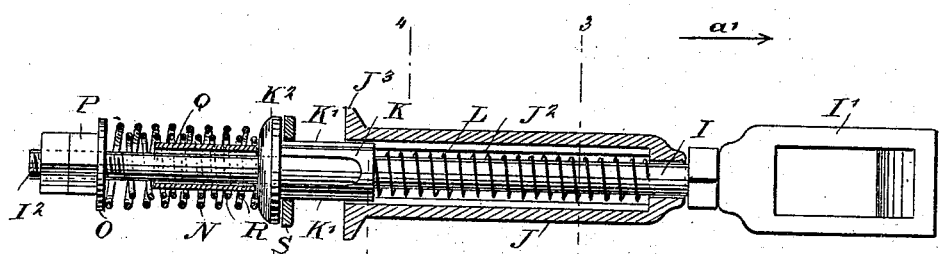
Fig. 5. Fig. 6.
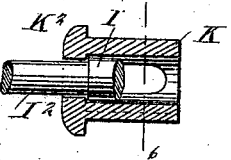
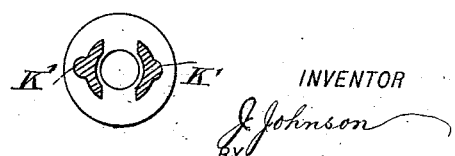
WITNESSES:
Chas. Nida
C. Sedgwick
INVENTOR
J. Johnson
BY
Munn & Co.
ATTORNEYS.

UNITED STATES PATENT OFFICE.

JOHN JOHNSON, OF CHESTER, PENNSYLVANIA.

PICKER-STICK CHECK FOR LOOMS.

SPECIFICATION forming part of Letters Patent No. 502,970, dated August 8, 1893.

Application filed January 31, 1893. Serial No. 460,289. (No model.)

*To all whom it may concern:*

Be it known that I, JOHN JOHNSON, of Chester, in the county of Delaware and State of Pennsylvania, have invented a new and Improved Picker-Stick Check for Looms, of which the following is a full, clear, and exact description.

The invention relates to picker staff checks, and its object is to provide a new and improved check which is simple and durable in construction, very effective in operation, arranged to properly protect the picker against breaking, and designed more particularly for use on picker staffs such as shown and described in the Letters Patent entitled "Picker-stick," granted to me March 14, 1893, and numbered 493,331.

The invention consists principally of a spring device formed of two portions and arranged on the spring-pressed rod connected with the lower end of the picker stick.

The invention also consists of certain parts and details and combinations of the same, as will be fully described hereinafter and then pointed out in the claims.

Reference is to be had to the accompanying drawings forming part of this specification, in which similar letters of reference indicate corresponding parts in all the figures.

Figure 1 is a side elevation of the improvement as applied. Fig. 2 is an enlarged sectional plan view of the improvement on the line 2—2 of Fig. 1. Fig. 3 is a transverse section of the same on the line 3—3 of Fig. 2. Fig. 4 is a similar view of the same on the line 4—4 of Fig. 2. Fig. 5 is a longitudinal section of the follower with part of the picker stick rod in place; and Fig. 6 is a transverse section of the same on the line 6—6 of Fig. 5.

On the leg A of the loom frame is arranged the bracket B, carrying the bolt C forming the pivot for the picker stick D, preferably made in two sections $D'$ and $D^2$ pivotally connected with each other by a knee joint $D^3$, and also by a spring E, as is plainly shown in Fig. 1 and more fully described in detail in the Letters Patent above referred to. The upper end of the section $D^2$ of the picker stick D engages the picker F fitted to slide in a suitable guideway G, the said picker stick section being arranged to pass freely through the picker F to permit the picker to slide easily in its guideway G. The section $D^2$ is also connected with the usual strap H for imparting the necessary motion in one direction to the picker stick D. The lower end of the section $D'$ of the picker stick D fits into a shoe $I'$ held on one end of a rod I, mounted to slide longitudinally in a bearing J formed with an ear $J'$ secured by bolts or other means to the bracket B, as is plainly shown in Fig. 1. The bearing J is formed interiorly, on opposite sides, with longitudinally extending grooves $J^2$ forming guideways for longitudinal projections $K'$ formed on a follower K fitted to slide in the said bearing J and pressed on at its inner end by one end of a spring L coiled on the rod I within the bearing J, the other end of the said spring resting against a shoulder inside of the bearing, see Fig. 2. The follower K is formed on its outer end with a head $K^2$ through which passes the reduced end $I^2$ of the rod I, see Fig. 5. Against the outer face of this head $K^2$ of the follower K presses one end of a spring N also pressing with its other end against a washer O abutting on the nuts P screwing on the outer, threaded end of the reduced part $I^2$ of the rod I.

On the outer face of the head $K^2$ of the follower K, and within the spring N rests one end of a sleeve Q, loosely fitted on the reduced end $I^2$ of the rod I, the said sleeve being surrounded by an additional coiled spring R, of a length somewhat less than the spring N, so that when the parts are in the position shown in Fig. 2, one end of the said inner spring R does not touch the washer O, see Fig. 2. When, however, the rod I is drawn outward in the direction of the arrow $a'$ by the action of the strap H pulling on the picker stick D, then the follower K slides inward on the bearing J to compress the spring L, it being understood that the spring N is sufficiently powerful to keep the head $K^2$ of the follower K on the shoulder of the rod I (see Fig. 5) against the tension of the spring L, to compress the same until the follower head $K^2$ is seated on the corresponding head $J^3$ of the bearing J.

In order to deaden the noise of contact between the heads $K^2$ and $J^3$, I prefer to place a washer S, of leather or other suitable material, on the follower K between the heads $K^2$ and $J^3$. After the head $K^2$ is seated as described, on the movement of the rod I in the aforesaid direction, then the spring N is compressed, and finally, on a further outward movement of the said rod the inner spring R becomes active and likewise compresses, its free end then resting against the washer O. Now, it will be seen that by this arrangement the rod I is subjected to the pressure of the graduated springs L, N and R compressed successively according to the outward movement of the rod I, as above explained. By this arrangement the spring L is compressed until the head $K^2$ rests against the head $J^3$, after which a further compression of the said spring L does not take place, even on the further outward movement of the rod I. The spring N is then suddenly more forcibly compressed on the further outward movement of the rod I, until finally the interior spring R is likewise compressed to again oppose with an increased resistance the movement of the rod I. The outward movement of the rod I is finally limited by the washer O striking against the free end of the sleeve Q. By this device the picker is completely protected against breakage, it being understood that when the head $K^2$ of the follower K strikes against the head $J^3$ of the bearing J, the movement of the picker stick D is suddenly checked by the suddenly increased resistance opposed by the stronger spring N, and the same operation will be repeated when the spring R comes into action. The picker F which is connected to the upper end of the picker stick D, will likewise be suddenly checked in its movement, and its momentum will be considerably decreased, so the picker will be effectively protected from breakage even if it strikes against the hard iron socket at the end of the box. This battering of the picker against the said socket can, however, be entirely prevented, since by adjusting the nuts P the washer O can be moved longitudinally on the reduced end $I^2$ of the rod I, so as to regulate the tension of the spring N, and thus time the action of the same, whereby the throw of the picker stick D and the stroke of the picker F can be regulated with great accuracy. It will be seen that spring L is relieved of further pressure when the head $K^2$ of the follower K strikes against the head $J^3$ of the bearing J, and similarly the springs N and R are relieved of further compression when the washer O strikes against the sleeve Q. The head $J^3$ and sleeve Q therefore constitute stops to limit the compression of the springs L, N and R respectively, so that any undue strain on the said springs is effectively prevented.

Having thus fully described my invention, I claim as new and desire to secure by Letters Patent—

1. A loom provided with a picker stick, a spring device connected with the picker stick and adapted to counteract the movement of the same in one direction, and return the picker stick, said spring device being formed of two portions and a stop whereby one portion of the spring device is relieved of further strain before the end of the movement of the picker stick, and the remaining portion subjected to a suddenly increasing tension, so as to check the movement of the picker stick and prevent breakage of the picker, substantially as shown and described.

2. A loom provided with a picker stick, a sliding rod connected therewith, a spring device pressing on the rod and adapted to be compressed on the outward movement of the rod, said spring device being formed of two portions and a stop whereby one portion of the spring device is relieved of further compression before the end of the movement of the picker stick, and the remaining portion subjected to a suddenly increasing compression, so as to check the movement of the picker stick and prevent breakage of the picker, substantially as shown and described.

3. A loom provided with a picker stick a bearing, a rod fitted to slide in the bearing and connected with the picker stick, a follower held loosely on the said rod and having a limited sliding movement in the said bearing, a spring coiled in the bearing around the said rod and pressing against the said follower, a second spring pressing on the head of the follower, and an adjustable device on the end of the said rod for engaging the said second spring, substantially as shown and described.

4. A loom provided with a picker stick a bearing, a rod fitted to slide in the bearing and connected with the picker stick, a follower held loosely on the said rod and having a limited sliding movement in the said bearing, a spring coiled in the bearing around the said rod and pressing against the said follower, a second spring pressing on the head of the follower, an adjustable device on the end of the said rod for engaging the said second spring, and a third spring inclosed within the said second spring and adapted to be actuated after the second spring is pressed, substantially as shown and described.

5. In a loom, the combination, with the picker and the picker stick, of a stationary bearing, a rod fitted to slide in the bearing and connected with the picker stick, a follower held loosely on the said rod and fitted to slide in the said bearing, said follower being provided with a head outside the bearing, a spring coiled in the bearing around the said rod and pressing against the said follower, a washer held on the follower in contact with its head and adapted to strike against the bearing and thereby limit the movement of the follower, a second spring pressing on the head of the follower in the opposite direction to the first spring, and an adjustable device on the end of the said rod for engaging the said second spring, substantially as described.

6. In a loom, the combination, with the picker and the picker stick, of a stationary bearing, a rod fitted to slide in the bearing and connected with the picker stick, a follower held loosely on the said rod and fitted to slide in the said bearing, said follower being provided with a head outside the bearing, a spring coiled in the bearing around the said rod and pressing against the said follower, a washer held on the follower in contact with its head and adapted to strike against the bearing and thereby limit the movement of the follower, a second spring pressing on the head of the follower in the opposite direction to the first spring, an adjustable device on the end of the said rod for engaging the said second spring, a third spring inclosed within the said second spring and adapted to be actuated after the second spring has been compressed to a certain extent, and a sleeve surrounding the said rod to limit the distance between the said adjustable device and the head of the follower, substantially as described.

JOHN JOHNSON.

Witnesses:
BENJ. C. FOX,
JOSIAH SMITH.